United States Patent
Kargula

[11] Patent Number: 5,662,359
[45] Date of Patent: Sep. 2, 1997

[54] QUICK CONNECT COUPLING WITH LOCK RING AND INDICATOR

[75] Inventor: Christopher J. Kargula, Sterling Heights, Mich.

[73] Assignee: Form Rite, Auburn Hills, Mich.

[21] Appl. No.: 520,465

[22] Filed: Aug. 28, 1995

[51] Int. Cl.[6] ................................................ F16L 35/00
[52] U.S. Cl. ...................... 285/93; 285/319; 285/307; 285/86
[58] Field of Search ............................ 285/23, 81, 84, 285/85, 86, 93, 307, 319

[56] References Cited

U.S. PATENT DOCUMENTS

| | | |
|---|---|---|
| 4,790,571 | 12/1988 | Montanari et al. ............ 285/86 |
| 4,913,467 | 4/1990 | Washizu . |
| 4,919,457 | 4/1990 | Moretti . |
| 4,948,176 | 8/1990 | Bartholomew . |
| 5,178,424 | 1/1993 | Klinger . |
| 5,226,679 | 7/1993 | Klinger . |
| 5,342,099 | 8/1994 | Bahner et al. . |
| 5,356,181 | 10/1994 | Shirogane et al. ............ 285/86 |
| 5,395,140 | 3/1995 | Wiethorn . |
| 5,489,125 | 2/1996 | Hohmann .................. 285/81 |
| 5,496,074 | 3/1996 | Viratelle et al. ............. 285/86 |
| 5,542,717 | 8/1996 | Rea et al. ................. 285/319 |

FOREIGN PATENT DOCUMENTS

| | | | |
|---|---|---|---|
| 549860 | 7/1993 | European Pat. Off. ........... 285/86 |
| 360241 | 4/1906 | France ........................ 285/86 |
| 50170 | 10/1966 | Germany ...................... 285/86 |
| 352880 | 12/1937 | Italy ......................... 285/86 |
| 581273 | 10/1976 | Switzerland .................. 285/86 |
| 855603 | 12/1960 | United Kingdom .............. 285/86 |

*Primary Examiner*—Eric K. Nicholson
*Attorney, Agent, or Firm*—Howard & Howard

[57] ABSTRACT

An improved fluid quick connect coupling includes a retainer and a lock ring. The lock ring locks the retainer legs against radially outward flexing. The lock ring is initially contacted by a tube being moved into the coupling, and moves with the tube, until it no longer prevents radially outward flexing of the retainer legs. The retainer legs then flex radially outwardly, allowing the tube to move to its fully inserted position. The lock ring is biased back outwardly once the tube is connected, and has tabs that extend axially outwardly beyond the retainer to provide a visual indication to the installer of when the tube is fully connected.

21 Claims, 3 Drawing Sheets

QUICK CONNECT COUPLING WITH LOCK RING AND INDICATOR

BACKGROUND OF THE INVENTION

This invention relates to an improved quick connect coupling that is adaptable to various size tubes, and which further provides a visual indication of a complete connection.

Quick connect couplings are known for quickly providing a secure connection between two fluid-carrying members. As examples, quick connect couplings are typically utilized to connect a tube into a passage leading to or from fluid-utilizing components on vehicles. The quick connect couplings typically include a retainer having a plurality of legs which flex radially outwardly to allow passage of an enlarged bead on the tube. The tube bead moves past the flexible legs, which are forced radially outwardly by the bead. The legs snap back behind the bead once the bead has moved axially beyond the legs securing the tube in the housing.

Quick connect couplings have not always provided adequate ability to secure various sizes or configurations of tubes. Instead, the technology has typically required that the coupling be designed for the particular tube. It would be preferable to develop a quick connector coupling which is adaptable to different sizes of tubes, yet provides an adequate seal.

Moreover, many quick connect couplings do not always adequately resist side loads on the connection. It would be preferable to provide increased side load resistance.

Further, in the past installers have sometimes only partially inserted a tube into a quick connect coupling. The prior art has developed several types of visual indications of when the tube is fully connected. Those indicators have not fully addressed the problem of providing an indication of a complete connection to the installer.

SUMMARY OF THE INVENTION

In a disclosed embodiment of this invention a quick connect coupling includes a two-part structure with a retainer having a plurality of legs that flex to allow passage of an enlarged bead on a tube. A lock ring is received on a ledge in the retainer, and locks the retainer legs against movement radially outwardly. The tube bead initially contacts a leg on the lock ring, and moves the lock ring off of the retainer ledge. Once the lock ring has moved off of the ledge, the retainer legs flex radially outwardly to allow passage of the tube bead. The lock ring legs then flex over the tube bead. The tube bead eventually moves axially inwardly beyond the retainer legs, and the retainer legs snap back radially inwardly securing the tube. There is an audible click as the retainer legs snap back. Once the retainer has moved to this fully connected position, the lock ring is biased back onto the ledge, and holds the retainer legs at a locked position. The retainer will not allow the tube to move back outwardly of the connector.

In another aspect of this invention, the retainer and at least the outermost part of the lock ring are formed of different colors. In the fully connected position, the lock ring has outermost tabs which extend outwardly of the retainer. Since the tabs are formed of a different color, an observer will be able to identify a fully-connected tube by looking for the different colored tabs.

In another aspect of this invention, an elongated seal is positioned axially inwardly from the retainer and conforms to various types and sizes of tube end configurations. The inventive seal has a plurality of ribs at its outer periphery and preferably at least one rib at its inner periphery. The ribs allow the seal to compress to various sizes and configurations to conform to the end portion of the tube. If the tube is of a relatively small diameter at its inner end, the ribs will force the seal into contact with the tube. On the other hand, if the tube inner end is of relatively large diameter the ribs allow the seal to be compressed to conform to larger diameter tubes and an adequate seal is still provided.

These and other features of the present invention can be best understood from the following specification and drawings, of which the following is a brief description.

DETAILED DESCRIPTION OF THE PREFERRED EMBODIMENT

Figure 1:
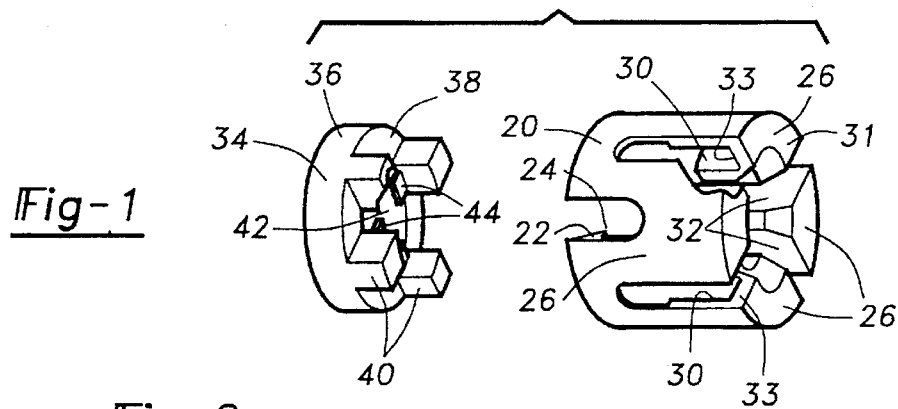
FIG. 1 is an exploded view of a retainer according to the present invention.

FIG. 1 shows a retainer 20 which forms a portion of the inventive quick-connect coupling of the present invention. Locking portions 22 have a locking tooth 24 which will snap onto a housing as will be described. Retainer legs 26 extend radially inwardly to innermost portions 28. The retainer legs 28 retain a tube within a bore of the retainer, as will be described below. A ledge 30 is formed on each of the legs 26. An axially outermost portion 31 of the retainer 20 is formed by the several legs 26. Gaps 32 are formed between end faces of adjacent legs 26. The ledge has an outer end 33. In the illustrated embodiment there are four legs 26 and four gaps 32.

A lock ring 34 slides within ledge 30 to prevent the retainer legs 26 from moving radially outwardly. The lock ring 34 has a cylindrical portion 36 which slides within the ledge 30. A forwardmost end 38 of the cylindrical portion 36 selectively abuts outer end 33 of the ledge 30. As will be described below, a spring biases the lock ring 34 axially outwardly towards end 33 of the ledge 30. A plurality of tabs 40 on lock ring 34 are received in the gaps 32. When an observer sees the tabs 40 extending outwardly and forwardly of the end face 31, that observer will have an indication that the tube is fully connected within the retainer. A plurality of lock ring legs 44 extend radially inwardly from an inner bore 42 of the lock ring 34.

Figure 2:
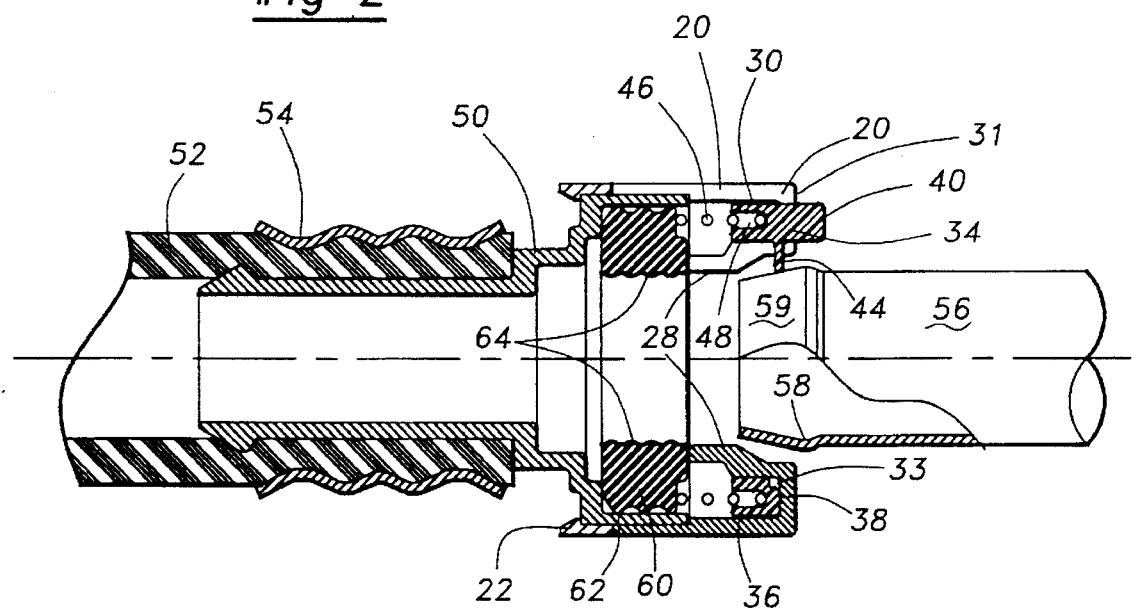
FIG. 2 shows a view of a tube being connected in the connector of the present invention.

As shown in FIG. 2, lock ring 34 is received within the retainer 20, and spring 46 extends into a slot 48 in the rear of cylindrical portion 36. Spring 46 biases the lock ring 34 outwardly such that end face 38 abuts outer end 33 of ledge 30. As shown, the tabs 40 extend forwardly of the end face 31 in this position.

Housing 50 receives the locking legs 22 to secure the retainer 20 onto the housing 50. Housing 50, and the quick-connect coupling of this invention are particularly useful when utilized with a hose connection. Hoses are connected to a variety of different types of tubes. In the past, various types of hose clamps which are tightened by bolts or screws have been utilized to seal the several different sizes of tubes that may be connected to hoses. It would be desirable to develop a quick-connect coupling adaptable to use by the several types of tubes to be connected to a hose. Moreover, it would be desirable to develop such a coupling which provides an adequate seal. As shown, the hose 52 is clamped to the housing 50 by a crimp connection member 54.

The tube 56 has an enlarged bead 58 with a forward ramped portion 59 that is to be received within the quick connector housing 50. As also shown, a seal 60 is received within the housing 50 and has a plurality of ribs 62 at its outer periphery and a plurality of ribs 64 at its inner periphery. As will be explained, the ribs accommodate various dimensions and configurations for the inner end of tube 56. In the illustrated position, the tube 56 is being inserted into the coupling. The ramped portion 59 has contacted the legs 44 on the lock ring 34. The lock ring 34 will now begin to move to the left or axially inwardly against the force of the spring 46. In this position, the lock ring cylindrical portion 36 still remains on the ledge 30. Thus, the legs 26 may not move radially outwardly.

Figure 3:
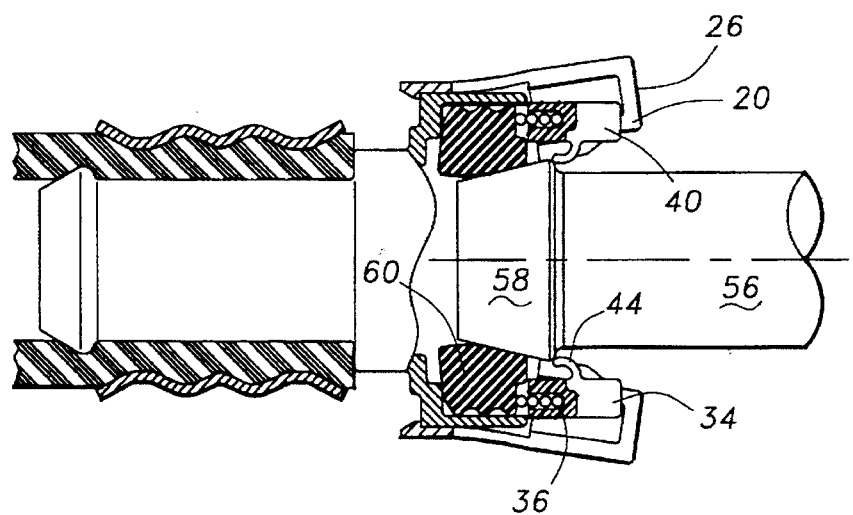
FIG. 3 shows a subsequent step in the connection of a tube.

As shown in FIG. 3, after sufficient movement, the lock ring 34 has moved off, or out of ledge 30. At that time, retainer legs 26 may begin to flex radially outwardly to allow passage of the bead 58. As shown in this position, the cylindrical portion 36 of lock ring 34 is close to abutting an outer end of seal 60.

Figure 4:
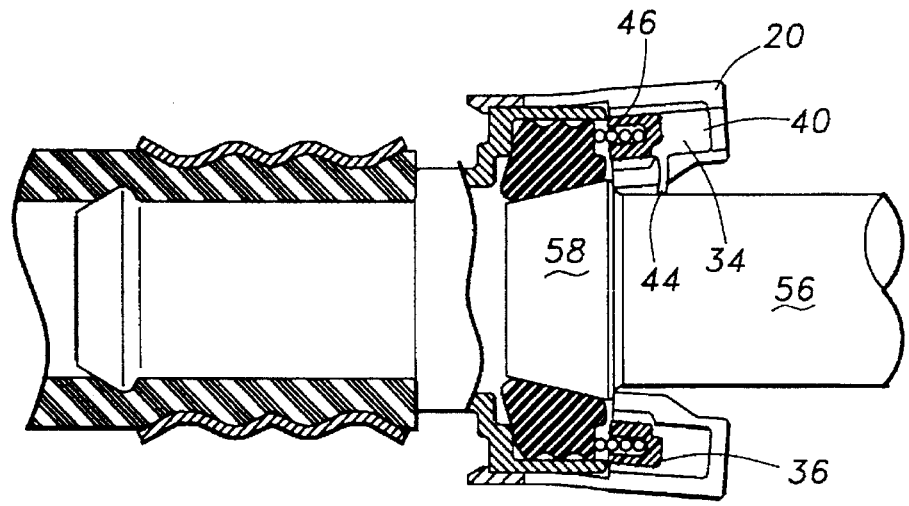
FIG. 4 shows yet another subsequent step in the connection of the tube.

The lock ring 34 may no longer move further axially inwardly, and further inward movement of the tube causes the legs 54 to move beyond the bead 58. Thus, as shown in FIG. 4, while the legs 26 continue to flex radially outwardly with further tube insertion, the legs 44 and the lock ring 34 now move axially beyond bead 58. Spring 46 now urges the lock ring 34 axially outwardly. Soon thereafter, bead 58 moves beyond the retainer legs 26, which snap back radially inwardly.

Figure 5:
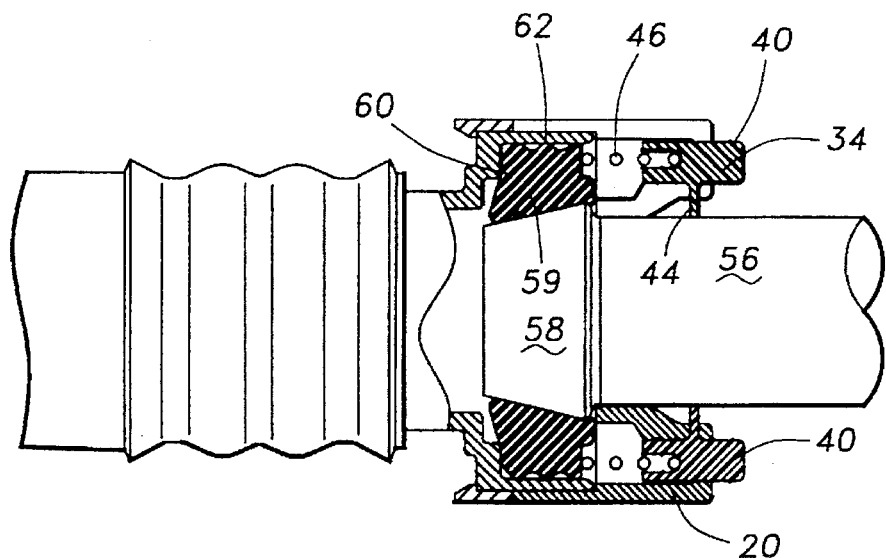
FIG. 5 shows the final step in the connection of the tube.

As shown in FIG. 5, the tube is now fully connected. The radially outward flexing of the legs 26 has allowed the bead 58 to move axially inwardly such that the bead 58 and tube inner end portion 59 compress portions of the seal 60. As also shown, in this position, the spring 46 has forced the lock ring 34 axially outwardly such that the tabs 40 extend beyond the forwardmost face 31 of the retainer 20. It is preferred that the lock ring 34 and the retainer 20 be formed of different color materials. Thus, an observer will be able to identify the tabs 40, and identify a fully connected tube.

When the lock ring is back in the position shown in FIG. 5, the cylindrical portion 36 is again received within the ledge 30. When cylindrical portion 36 is in ledge 30, the legs 26 may not flex outwardly, and thus side load or any other load tending to try to move the retainer legs 26 apart is resisted.

Moreover, when moving between the FIG. 4 and FIG. 5 positions, the legs 26 and their inner portion 28 snap back radially inwardly. This movement will be associated with an audible click that will also provide feedback to the installer that the tube 56 is fully connected.

Figure 6:
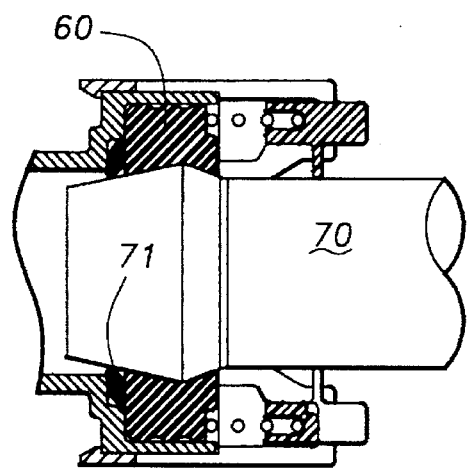
FIG. 6 shows a fully connected relatively large tube.
Figure 7:
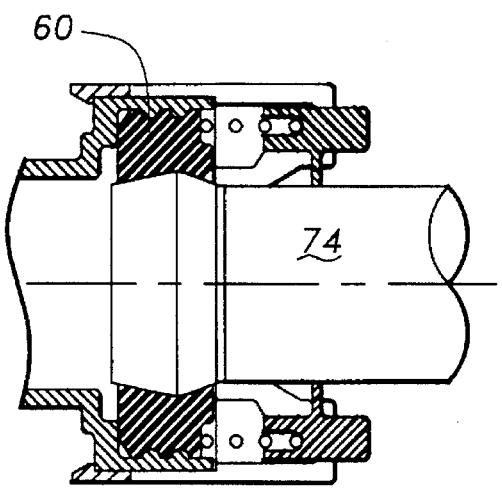
Figure 8:
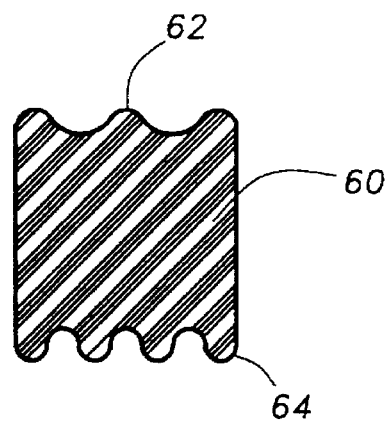
FIG. 8 shows a first embodiment seal.

FIG. 6 shows a worst case scenario wherein a relatively large tube 70 with a long inner end is received within the seal 60. As shown an area 71 provides space to allow seal 60 to expand as required for this tube 70. FIG. 7 shows a worst case scenario where a relatively short inner and relatively small tube is received within the seal 60. As shown, the ribs 62 and 64 flex to accommodate the various diameter and shapes of the tubes 70 and 74. Thus, the tube is accommodated by the varying diameters of the seal 60 due to the ribs 62 and 64. FIG. 8 shows seal 60 with ribs 62 and 64.

Figure 9:
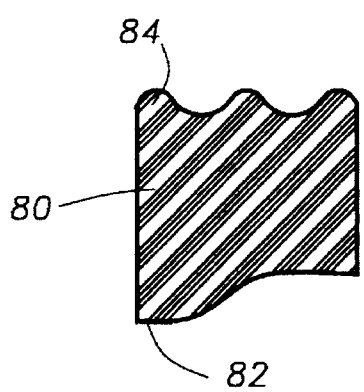
FIG. 9 shows a second embodiment seal.

FIG. 9 shows a second embodiment seal 80 wherein there are plural ribs 84 at an outer periphery, but only a single rib 82 at an inner periphery.

Figure 10:
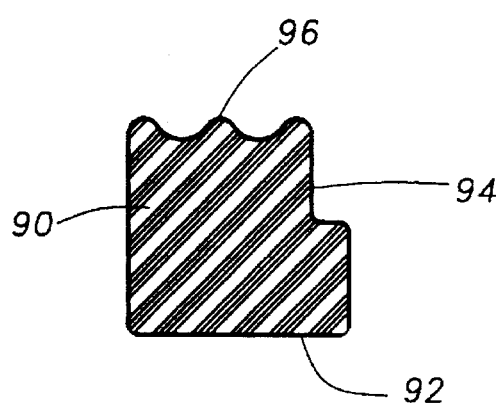
FIG. 10 shows a third embodiment seal.

FIG. 10 shows a third embodiment seal 90 wherein there are plural ribs 96 at the outer periphery, but the inner periphery 92 is smooth a forward step 94 is included to assist piloting of spring 46.

The ribs compress to accommodate a larger tube inner end. At the same time the ribs ensure contact with a smaller tube inner end to provide an adequate seal.

The present invention thus improves upon the prior art by utilizing a seal 60 which can conform to the shape of various diameter and sizes and configurations of tubes. Moreover, the inventive use of the combined lock ring and retainer provides a solid connection resisting any side force loads for withdraw of the tube. The lock ring also has the multiple purpose of providing a visual indication of complete connection and a release mechanism when the tabs 40 are pressed axially inward.

The lock ring, retainer and seal are preferably formal of known materials based upon the functions described in this application. As examples only, the lock ring may be formed of nylon, the retainer of nylon, and the seal of an elastomer such as Ethylene-Propylene-Diene (EPDM).

Although a preferred embodiment of this invention has been disclosed, a worker of ordinary skill in the art would recognize that certain modifications would come within the scope of this invention. For that reason, the following claims should be studied to determine the true scope and content of this invention.

I claim:

1. A quick connect fluid coupling comprising:

a retainer having a central bore defining an axis, and having portions which move radially outwardly to allow passage of an enlarged portion of a tube: and a lock member separate from said retainer and received in a space defined by said retainer and biased to a lock position resisting radially outward movement of said retainer portions such that said lock member holds said retainer locked, movement of a fluid tube axially inwardly into the coupling abutting and moving said lock member axially inwardly to a release position where it no longer resists movement of said retainer portions radially outwardly, and such that said retainer portions may move radially outwardly to allow passage of the tube.

2. A coupling as recited in claim 1, wherein said lock member provides a visual indication of connection of the tube when in said lock position.

3. A coupling as recited in claim 2, wherein said lock member has a plurality of tabs that extend axially outwardly of said retainer when in said lock position to provide said visual indication.

4. A coupling as recited in claim 3, wherein said lock member tabs and said retainer are formed of different colors to facilitate said visual identification.

5. A coupling as recited in claim 1, wherein said retainer portions include a plurality of flexible legs which are biased radially outwardly to allow passage of the enlarged portion of the tube, and which move back radially inwardly outwardly of the enlarged portion to lock the tube in said retainer.

6. A coupling as recited in claim 1, wherein a seal is positioned axially inwardly of said lock member and said retainer, said seal being adaptable to seal on various sizes of tubes.

7. A coupling as recited in claim 6, wherein said seal has ribs on one of an inner peripheral and an outer peripheral surface to facilitate adjustment of said seal to different size tubes.

8. A coupling as recited in claim 7, wherein said seal has at least one rib on both said inner and outer peripheral surfaces.

9. A coupling as recited in claim 1, wherein said retainer includes a ledge adjacent an axially outer portion of said retainer, said lock member being received within said ledge in said lock position, and preventing radially outward movement of said retainer portions, and movement of said lock member to said release position including said lock member moving off of said ledge, allowing said retainer portions to move radially outwardly.

10. A coupling as recited in claim 9, wherein a spring biases said lock member into said ledge and to said lock position.

11. A coupling as recited in claim 10, wherein said ledge is generally cylindrical, and including spaced gaps, said lock member having tabs extending axially outwardly through said gaps when said lock member is received within said ledge, and said tabs providing a visual indication of the tubing being connecting within said coupling.

12. A coupling as recited in claim 11, wherein said tabs are a different color than said retainer to assist in said visual indication.

13. A coupling as recited in claim 11, wherein said retainer having a plurality of circumferentially-spaced legs which flex radially outwardly to allow passage of the enlarged portion on the tube, and then move back radially inwardly behind the enlarged portion to secure the tube within said retainer, and said gaps being formed by spaces between said retainer legs.

14. A coupling as recited in claim 1, wherein said lock member has a plurality of legs extending radially inwardly, said legs being positioned axially outwardly of a radially innermost portion of said retainer legs, such that when a tube is inserted into said retainer, said tube initially contacts said lock member legs and cause said lock member legs to move axially inwardly along with the tube, to said release position.

15. A fluid quick connect coupling comprising:

a housing defining a central bore for receiving a fluid-carrying tube;

a tube received within said bore;

a retainer having a plurality of flexible legs securing said tube within said housing, said tube having a bead of a greater outer diameter than portions of said tube spaced axially outwardly of said bead, said legs on said retainer being positioned axially outwardly of said bead for securing said tube within said housing by preventing axially outward movement of said bead, said legs being flexible such that upon insertion of said tube into said housing, said retainer legs move radially outwardly to allow passage of said bead, said legs moving back radially inwardly after being passed axially by said bead, said retainer including a ledge positioned axially outwardly of said retainer legs; and a lock member slidable within said ledge, said lock member being biased towards a lock position where it prevents radial outward movement of said retainer legs, said lock member moving in a direction against said bias when said tube is inserted into said housing such that said lock member moves out of said ledge and allows said retainer legs to flex radially outwardly.

16. A coupling as recited in claim 15, wherein said lock member has a cylindrical portion at an axially inner position and a plurality of tabs extending axially outwardly from said cylindrical portion, said tabs extending axially outwardly beyond said retainer to provide a visual indication of when said lock ring is in said lock position.

17. A coupling as recited in claim 16, wherein said cylindrical portion of said lock member including a groove and a spring received in said groove and biasing said lock member axially outwardly and into said ledge.

18. A coupling as recited in claim 16, wherein said lock member has a plurality of legs extending radially inwardly, and positioned axially outwardly of said retainer legs said tube bead contacting said lock member legs as it is inserted to cause said lock member to move axially inwardly with said tube, such that said cylindrical portion of said locking member moves outwardly of said ledge, and said retainer legs then being able to flex radially outwardly to allow passage of said bead beyond said retainer legs.

19. A coupling as recited in claim 15, wherein said housing is connected to a fluid hose.

20. A coupling as recited in claim 15, wherein said lock member and said retainer are formed of different colored materials, such that a visual indication of complete connection is provided.

21. A coupling as recited in claim 15, wherein when said retainer legs move back radially inwardly to lock said tube in said housing, an audible click is provided to provide an installer with feedback of the complete connection of said tube in said coupling.

* * * * *